United States Patent
Vig et al.

(10) Patent No.: US 9,996,573 B1
(45) Date of Patent: Jun. 12, 2018

(54) DISTRIBUTED SYSTEM CAPACITY DIAL-UP

(71) Applicant: Amazon Technologies, Inc., Reno, NV (US)

(72) Inventors: Akshat Vig, Seattle, WA (US); Wei Xiao, Kirkland, WA (US); Somasundaram Perianayagam, Seattle, WA (US); Timothy Andrew Rath, Seattle, WA (US); Barry Bailey Hunter, Jr., Sammamish, WA (US); Kiran-Kumar Muniswamy-Reddy, Seattle, WA (US); Yijun Lu, Kenmore, WA (US); Qiang Liu, San Mateo, CA (US); Ying Lin, Seattle, WA (US); Stuart Henry Seelye Marshall, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 175 days.

(21) Appl. No.: 14/222,377

(22) Filed: Mar. 21, 2014

(51) Int. Cl.
  *G06F 17/30* (2006.01)
(52) U.S. Cl.
  CPC .............................. *G06F 17/30339* (2013.01)
(58) Field of Classification Search
  USPC .................................................. 707/778, 803
  See application file for complete search history.

(56) References Cited

U.S. PATENT DOCUMENTS

| | | | | |
|---|---|---|---|---|
| 6,219,668 B1 * | 4/2001 | Arnaud | .................. | G06Q 10/10 707/783 |
| 7,725,498 B2 * | 5/2010 | Barsness | ........... | G06F 17/30315 707/803 |
| 7,752,415 B2 * | 7/2010 | Vaupel | .................. | G06F 9/5077 711/173 |
| 7,898,947 B2 * | 3/2011 | Briscoe | ............... | H04L 41/0806 370/230 |
| 7,904,749 B2 * | 3/2011 | Kawaguchi | ......... | G06F 11/1076 714/2 |
| 8,539,150 B2 * | 9/2013 | Araki | .................. | G06F 12/0871 711/113 |
| 9,141,676 B2 * | 9/2015 | Lysne | ...................... | G06N 5/00 |
| 9,152,431 B2 * | 10/2015 | Watanabe | ........... | G06F 11/1417 |
| 9,152,664 B2 * | 10/2015 | Abrink | .............. | G06F 17/30339 |

* cited by examiner

*Primary Examiner* — Kim Nguyen
(74) *Attorney, Agent, or Firm* — Robert C. Kowert; Meyertons, Hood, Kivlin, Kowert & Goetzel, P.C

(57) ABSTRACT

A hosted service may limit access to a table initially comprising one or more partitions. Access to the table may be limited to a provisioned capacity. A client of the service may request an increased capacity. A minimum number of partitions for providing the increased capacity may be determined. Proportions of the increased capacity may be allocated among members of successive generations of partitions to be provided by a member of a generation or its descendants. The proportions may be allocated to minimize the costs associated with splitting partitions based on the minimum number of partitions.

21 Claims, 10 Drawing Sheets

DISTRIBUTED SYSTEM CAPACITY DIAL-UP

BACKGROUND

A provider may host a distributed database in a data center on behalf of a client. The distributed database may comprise tables, on which input and output operations may be performed in response to receiving requests from the client. The ability of the provider to perform input and output operations at the rate desired by the client may be restricted by the physical limitations of the underlying hardware, such as central processing unit ("CPU") speed, network bandwidth and other factors.

In order to provide sufficient capacity for performing the input and output operations, a distributed database may divide tables into partitions. The partitions may be hosted on separate computing nodes, allowing workload to be distributed between the partitions, as well as increasing the reliability and availability of the system. However, it may be difficult to accurately predict the amount of throughput the client will utilize. As a result, an initial set of partitions may not be sufficient to supply capacity for performing input and output operations at the rate requested by the client.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
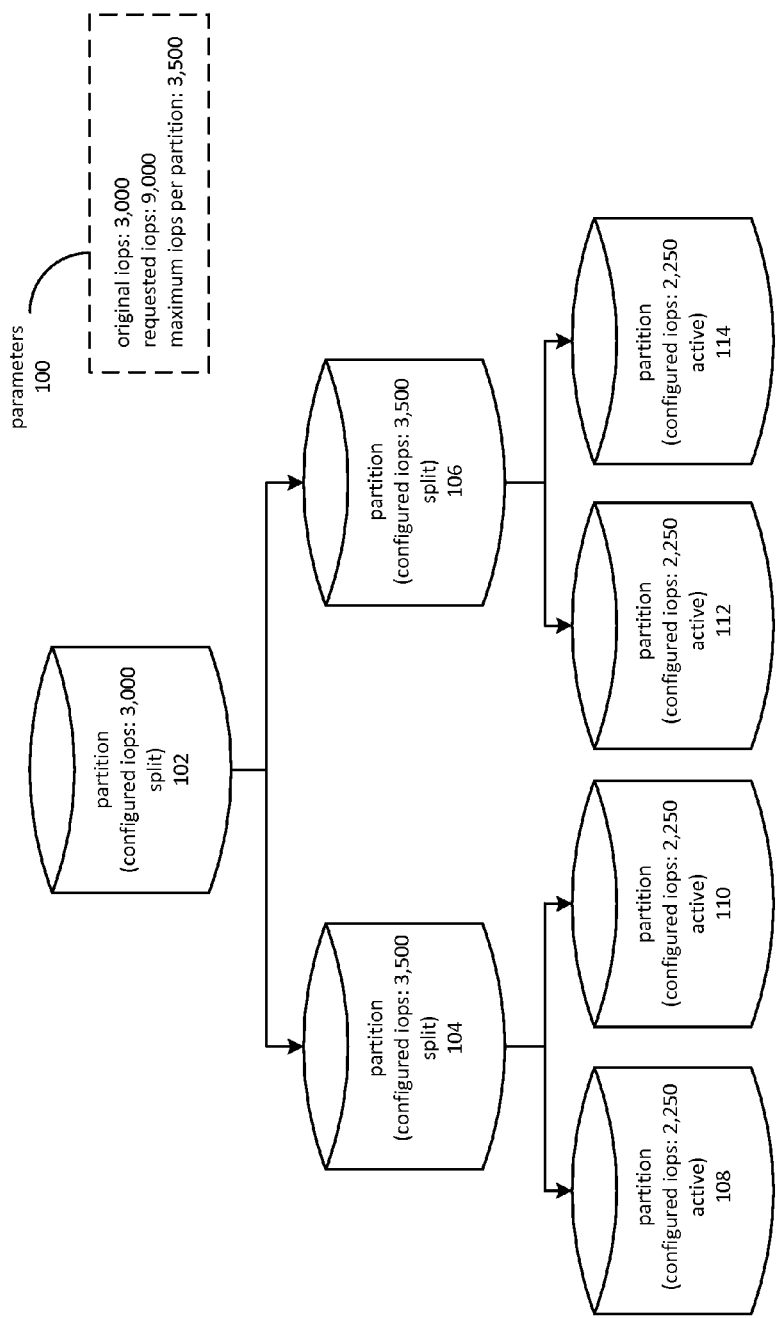
FIG. 1 is a block diagram depicting an example of increasing capacity by forming child partitions from a parent partition.

A distributed database management system ("DBMS") may maintain data organized by tables, each of which contains a set of items. The items may each comprise a set of name to value pairs, a set of values identified by column names or various other values. In various embodiments, individual items may not conform to any particular schema, and each item may accordingly contain a different number of values, each of which may have a different logical meaning and type. Values that have the same logical meaning and type, such as those identified by the same name or column, may for convenience be referred to as columns. Other embodiments of a DBMS may enforce particular structural requirements, such as row and column format, uniqueness constraints, primary and foreign key relationships and the like. Examples of distributed DBMSs include key-value databases, relational databases, non-structured query language ("NoSQL") databases, object-oriented databases and so forth.

In order to support large volumes of data and high workload demands, distributed DBMSs may support partitioning the data in a table over a number of computing nodes. Various forms of partitioning may be supported. In horizontal partitioning, each computing node may maintain a subset of the collection of items. In vertical partitioning, data may be divided based on columns or fields, so that each computing node may contain a subset of the columns defined on the table. Some distributed DBMSs may combine these two forms of partitioning. As used herein, the terms horizontal and vertical partitioning may refer to a division of a dataset consistent with the preceding description. Embodiments may host a partition on a computing node or group of computing nodes separate from other partitions.

Each partition may be replicated between computing nodes so that the same item, or a version of the same item, is stored on more than one computing node. This may improve the availability of the system, because if one of the computing nodes becomes unavailable another computing node having the replicated data may be able to step in and take its place. Replication may improve the scalability of the system by allowing workload to be shared among multiple computing nodes. Consistency between replicated partitions may be maintained using a technique that involves quorum or consensus between the replicated partitions. Embodiments may require quorum only among currently active computing nodes, which may improve availability because it does not require all of the computing nodes to be online.

A provider may host a DBMS in a datacenter and provide access to the DBMS as a service to various entities. In that regard, the DBMS may be exposed through a web service, a web application, a remote procedure call and so forth. These mechanisms and others may be referred to herein as services. In some embodiments, a DBMS may provide an integrated front-end that exposes one or more of the services to end users of the entities or customers. Through the services, the end users may make requests that include various operations and queries to be performed on the DBMS through the use of application programming interface ("API") calls to the service. A request may comprise, for example, an invocation of an API on behalf of a customer, as well as an invocation of an operation on a DBMS on behalf of a customer.

The provider may also require payment from a customer in exchange for the use of this capacity. However, the profitability of the endeavor may depend on a customer paying an amount that is proportional to the capacity consumed on its behalf. A limit on capacity consumption may be imposed on a customer and enforced through various techniques, such as throttling, queuing and so forth. When usage exceeds the amount provisioned to the customer, requests for services on behalf of a customer may be rejected or suspended. This may be disadvantageous to the customer in a variety of circumstances. For example, the service may be a component of an e-commerce web site or similar application, which may become non-functional if requests for the service are rejected.

As noted above, a limit on capacity consumption may be imposed on a client. In various embodiments, a client may be assigned a provisioned level of capacity consumption. This may be referred to as provisioned capacity. The term provisioned capacity may be distinguished from physical capacity because the former is imposed by the provider, while the latter is related to the capabilities of the underlying hardware. The client's level of capacity consumption may be limited in part using various estimation and measurement techniques. Because of the wide variety of computing resources that may be involved in processing a request, capacity consumption may be difficult to determine. However, various measurable quantities may serve as reasonable proxies for capacity consumption. In various embodiments, quantities such as the amount of data sent to or received from a client application may be employed to estimate the capacity consumed by processing a certain request. For example, a query request may scan a database table in order to determine rows that conform to the constraints specified in the query. The number of rows returned may be a proxy for capacity consumption. For example, if a single row of data is returned, the query may have been limited in scope and, therefore, is likely to have consumed less capacity than a query that resulted in many rows of data being returned.

Various embodiments may increase a limit on throughput provisioned to a client for performing operations on a table comprising one or more partitions. In some cases, an increase in provisioned throughput may be made by increasing the number of input/output operations that may be performed on a table on an existing partition. This may be done in a way that utilizes existing capacity of the partition or by expanding the capacity of the partition. However, a partition will generally have an associated maximum capacity for performing input/output operations on a table. The maximum capacity may be based at least in part on physical limitations of the partition, which may include limitations of an underlying computing node and any underlying hardware.

Embodiments may increase capacity of a table by adding additional partitions. This may involve splitting an existing partition, the parent, into two partitions that may be described as child partitions. Data from the parent partition may be apportioned to the child partition. For example, each child partition may be formed to contain half of the data initially managed by the parent partition. Some embodiments may copy half of the data from the parent partition to a first child partition, and copy the remaining half to the second child partition. The term "half" is used here for illustrative purposes. Other proportions might be used in various cases and embodiments.

Embodiments may form one of the child partitions directly from the parent by retaining half of the data and copying the remaining half to a second child partition. In this case, the parent is transformed into a child partition in order to reduce the amount of data that transferred while forming the child partitions. For illustrative purposes, the present disclosure may refer to or depict forming child partitions from a parent partition. It will be appreciated, however, that embodiments may in some cases form child partitions by reusing parent partitions, including those cases depicted in the accompanying figures.

FIG. 1 is a block diagram depicting an example of increasing capacity by forming child partitions from a parent partition. A table may initially comprise a first partition 102 initially configured to support 3,000 input/output operations per second ("iops"). As depicted by parameters 100, the table may initially be provisioned for 3,000 iops, and information may be received indicating that provisioned input/output operations should be increased to 9,000 iops. It may also be the case that an individual partition is able to support no more than 3,500 iops.

The embodiment depicted by FIG. 1 may provide support for 9,000 iops by forming a number of new partitions from partition 102. A first generation of child partitions may be formed by splitting partition 102 into partitions 104 and 106. In some cases, partition 102 may remain active while partitions 104 and 106 are being formed, and inactivated when formation of partitions 104 and 106 is complete.

Partitions 104 and 106 may each be initially configured to provide 3,500 iops, allowing for a total of 7,000 iops to be performed on the associated table. Embodiments may, in response to the total of iops that may be performed by the first generation of children being less than the requested 9,000 iops, create a second generation of children. This may be done, as depicted by FIG. 1, by splitting partition 104 into child partitions 108 and 110 and splitting partition 106 into child partitions 112 and 114. Assuming a maximum of 3,500 iops for each partition, the second generation of children may provide a total of 14,000 iops. This amount, however, is greater than the requested amount of 9,000 iops.

Embodiments may configure partitions in the final generation to evenly distributed provisioned iops. For example, as depicted in FIG. 1, partitions 108, 110, 112 and 114 may each be configured to provide 2,250 iops to a client of the associated table, in combination providing 9,000 iops as requested in parameters 100. Embodiments may provision iops across partitions in an evenly distributed manner for various reasons, such as to balance workload, allow for future iops increases and so on.

Figure 2:
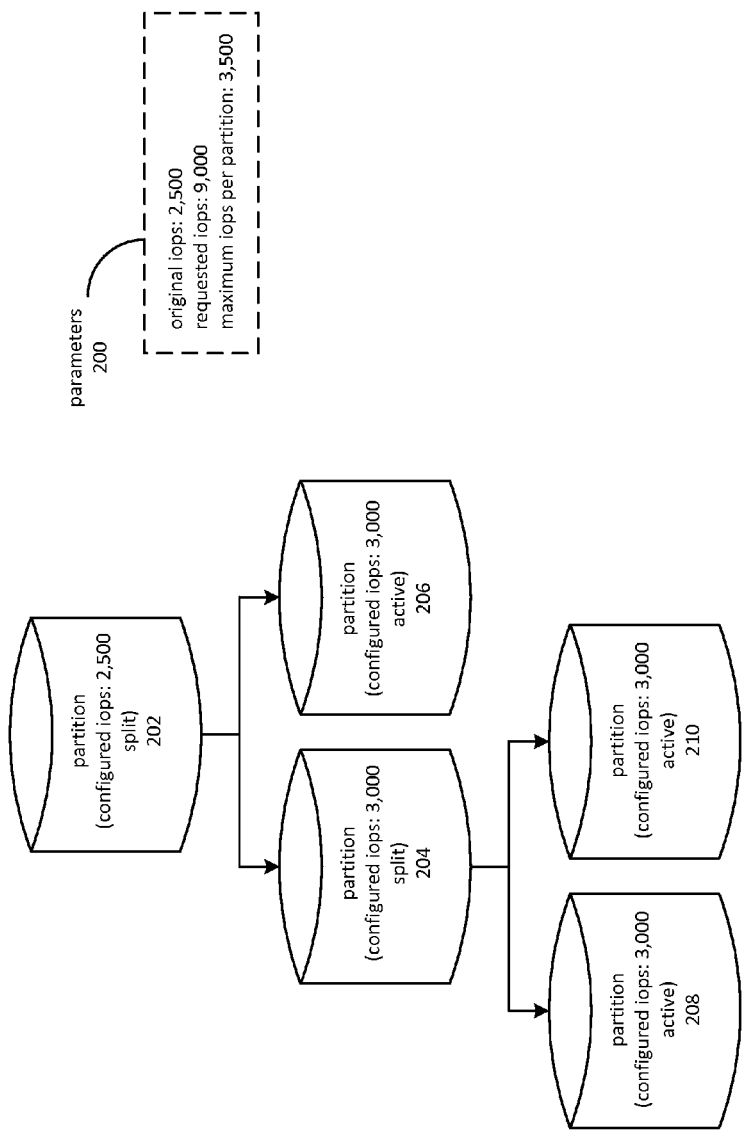
FIG. 2 is a block diagram depicting an embodiment of increasing capacity of a partitioned table without decreasing capacity provisioned to individual partitions between generations of partitions.

In the example of FIG. 1, the iops provisioned to individual partitions in the first generation (partitions 104 and 106) were greater than those provisioned to individual partitions in the second generation (partitions 108, 110, 112 and 114). FIG. 2 depicts a process for increasing iops for a partitioned table without decreasing iops provisioned to individual partitions between generations of partitions. Initially, a table may comprise partition 202, which may be initially be provisioned with 2,500 iops. As indicated by parameters 200, a request for other information may indicate that provisioned iops for the table as a whole should increase to 9,000 iops. The partitions may be subject, in this example, to a limit of 3,500 iops per partition. Under parameters 200, a minimum of three partitions may be used to provide a total of 9,000 iops, with each partition providing 3,000 iops.

A process for generating the three partitions may include splitting partition 202 into two child partitions 204 and 206. Each of these may be initially configured to provide 3,000 iops, thus avoiding a subsequent "dial-down" operation in which iops provided by a partition are reduced.

One of partitions 204 and 206 may be selected to be a member of the final set of partitions that will provide the requested amount of iops. This may be described as selecting the partition to be a terminal node in the process of generating partitions, for example a node that will not have any children. The determination of which partition, if any, may be selected as a terminal node may be based on the minimum number of partitions needed to provide the requested amount of iops. In the example of FIG. 2, it may be determined that three partitions are required and that one of the two child partitions in the first generation may, therefore, be selected as a terminal node. In FIG. 2, partition 206 may be selected as a terminal node, and partition 204 may be selected as a parent for the remaining partitions. Accordingly, partitions 208 and 210 may be formed by splitting partition 204. Partitions 208 and 210 may be configured to each provide 3,000 iops. Accordingly, the final set of partitions consisting of partitions 206, 208 and 210 may provide 9,000 iops in total.

The process just described may be summarized as follows: Each generation of partitions may be formed having provisioned iops equal to the expected per-partition iops in the final configuration. This value may be the requested number of total iops for the table divided by the minimum number of partitions needed to provide the requested number of total iops. Use of this approach could, for example, allow for partitions 204 and 206 to be used without having to dial-down provisioned iops. As noted previously, dial-down operations may be avoided by some embodiments. This may be done, for example, in response to a particular range of data being accessed with greater frequency than other data in a partition being split. Assume, for example, that access to partition 204 consists exclusively of access to a particular range of data that, after splitting, is located on partition 208. If partition 204 was configured prior to splitting at 3,500 iops, and partition 208 subsequently configured to 3,000, fewer iops would be available to process data in that range.

Figure 3:
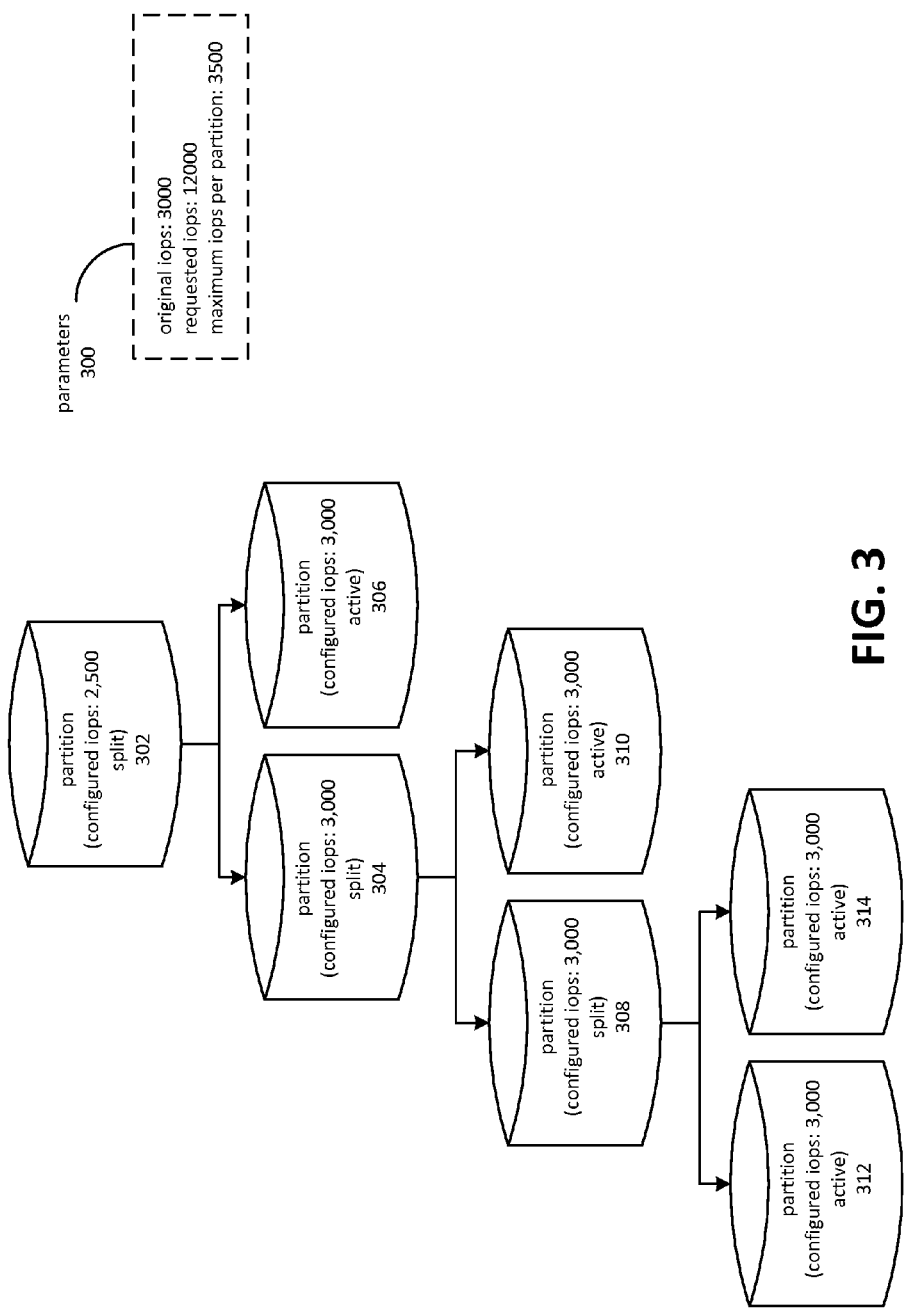
FIG. 3 is a block diagram depicting an embodiment of designating at least one partition as a terminal node in each generation of partitions.

Some embodiments may form at least one terminal node in each generation of partitions. FIG. 3 provides an example. As indicated by parameters 300, the example of FIG. 3 involves a table initially provisioned with 3000 iops, requested to provide 12,000 iops, and partitions having a maximum iops per partition of 3,500 iops.

Partition 302 may initially be provisioned with 2,500 iops. Embodiments may split partition 302 to form a first generation of partitions 304 and 306. At least one partition in the first generation of partitions may be designated as a terminal node, such as partition 306 in FIG. 3. The designated terminal node may be configured with a number of iops that is greater than or equal to the minimum number of per-partition iops, which may be the requested iops divided by the minimum number of partitions needed to provide the requested iops. In some embodiments, terminal and non-terminal nodes may be provisioned with a minimum of iops needed to provide the requested number, for various reasons including the dial-down case described herein.

In the second generation of partitions, partition 310 may be designated as a terminal node, while partition 308 may serve as a parent for the third generation. In the third generation, both partition 312 and partition 314 may be designated as final because no additional partitions are necessary.

Embodiments may designate at least one partition per generation as a terminal node in order to minimize operations such as copying, data transfer and the like that may be associated with splitting a partition. A partition designated as a terminal node may transition to an active state and remain in an active state during the remainder of the dial-up operation.

Figure 4:
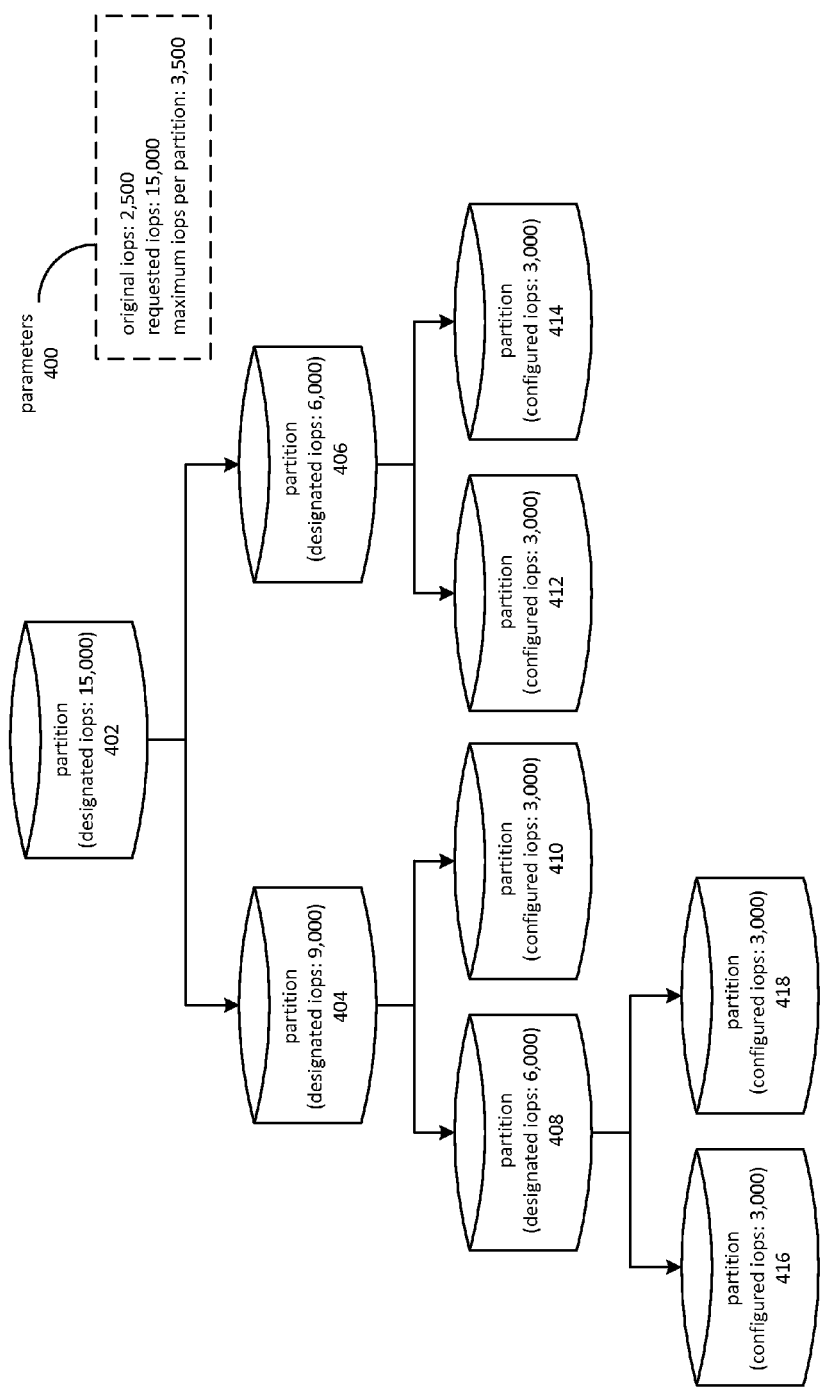
FIG. 4 is a block diagram depicting an embodiment of a process that involves designating a branch of each generation to provide an integral multiple of per-partition provisioned capacity.

As depicted by FIG. 4, some embodiments may employ a process that involves designating a branch of each generation to provide an integral multiple of per-partition iops. Each branch may be designated as providing an equal proportion of iops as compared to other members of the same generation. For example, partition 402 might initially be configured to provide 2,500 iops, and designated to provide 15,000 iops by its descendants. In the first generation partition 404 or its descendants might be designated to provide 9,000 iops, and partition 406 might be designated to provide 6,000 iops. These are integral multiples of a per-partition iops with values of 3,000, based on a minimum of five partitions being needed to provide 15,000 iops, consistent with parameters 400.

In a second generation of partitions, partitions 408 is designated to provide 6,000 iops via its descendants. Partition 410 may be configured to provide 3,000 iops, given a per-partition maximum of 3,500 iops as indicated by parameters 400. In other words, partition 408 has been designated to provide an integral multiple of iops equivalent to 2*3,000 iops, or $2/5^{ths}$ of 15,000 iops, while partition 410 may provide 1*3,000 iops, which is $1/5^{th}$ of the requested 15,000 iops. Partition 410 may be considered a terminal node because the integral multiple of iops designated to it is less than the maximum it can provide. Partitions 412 and 414, in the second generation of partitions, may be treated in the same manner. In the third generation, embodiments may allocate 6,000 iops evenly between partitions 416 and 418, allowing each of these partitions to be configured to provide 3,000 iops.

The preceding may be summarized as evenly dividing iops to be provided by a siblings in a generation of partitions, where the division is on a boundary defined by the per-partition iops to be provided by the final configuration of partitions. The final configuration may be calculated as the minimum number of partitions needed to provide the total number of iops. The per-partition iops in that case is the total number of iops divided by the minimum number of partitions. Various embodiments may employ different calculations, for example by incorporating additional partitions to allow for future iops growth.

Figure 5:
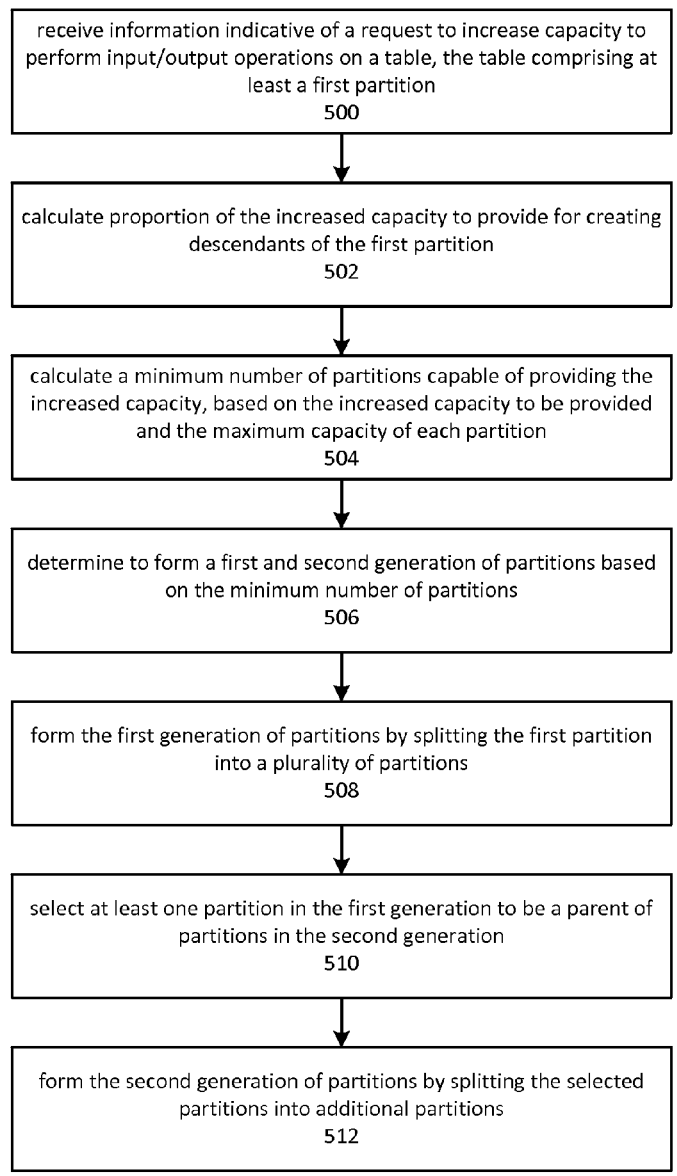
FIG. 5 is a flowchart depicting an example embodiment of a process for increasing capacity of a distributed database table by forming successive generations of child partitions from a parent partition.

FIG. 5 is a flowchart depicting an example embodiment of a process for increasing capacity of a distributed database table by forming successive generations of child partitions from a parent partition. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 500 depicts receiving information indicative of a request to increase capacity to perform input/output operations on a table. The table may comprise one or more partitions. In some embodiments, each partition may be maintained on one or more computing nodes. Capacity may be increased in response to various events, such as receiving a request from a client of a provisioned table, in response to monitoring capacity utilization and so forth.

Operation 502 depicts calculating a proportion of the increased capacity that may be provided by creating descendants of a table partition. Embodiments may determine that some proportion of the increased capacity should be based on splitting an existing partition into two or more children to form a first generation of child partitions, splitting one or more of those children into additional partitions to form a second generation and so on. Embodiments may select partitions to be parents for generations of partitions based on various factors that include the proportion of work currently handled by a partition. Calculating the proportion of increased capacity to be provided by a partition may involve a ratio of read operations to write operations. In some cases and embodiments, write operations may consume more resources than read operations. It may also be the case that the workload associated with certain partitions is skewed toward a particular type of operation.

Embodiments may, as depicted by operation 504, calculate a minimum number of partitions capable of providing the increased capacity to be provided by descendants of a partition. This may be based on the increased capacity to be provided and the maximum capacity of a partition. For example, the minimum number of partitions may be calculated by dividing a value indicative of the increased capacity by a value indicative of the maximum capacity of a partition.

At operation 506, embodiments may determine to form at least a first and second generation of partitions based on the minimum number. Various embodiments may perform splitting operations on a partition in which two partitions are formed from a single partition or some other ratio. Embodiments may therefore determine to form multiple generations of partitions. The number of generations that are generated may depend on various factors, such as the techniques applied to selecting parents for each subsequent generation. Various techniques and approaches for doing so are described herein.

Operation 508 depicts forming the first generation of partitions by splitting a partition into two or more partitions. Splitting a partition may involve transmitting a subset of a plurality of items stored on a parent partition to a child partition. The parent may retain the remaining items and be reformed as its own child. Some embodiments, however, may form two or more new child partitions, each consisting of a subset of the plurality of items maintained by the parent partition, and in total accounting for all of the plurality of items originally maintained by the parent. The parent partition may be deactivated.

One or more of the children in the first generation may be selected as a parent of the next generation, as depicted by operation 510. The selection may be based on various factors including evenly dividing iops to be provided among each sibling in a generation, minimization of the cost of forming splits and so on. Various techniques for selecting one or more parents for the next generation are described herein.

Operation 512 depicts forming a second generation of partitions from partitions from the first generation that have been selected as parents. Additional generations of partitions may be formed in order to produce the number of partitions needed to provide the requested iops.

Figure 6:
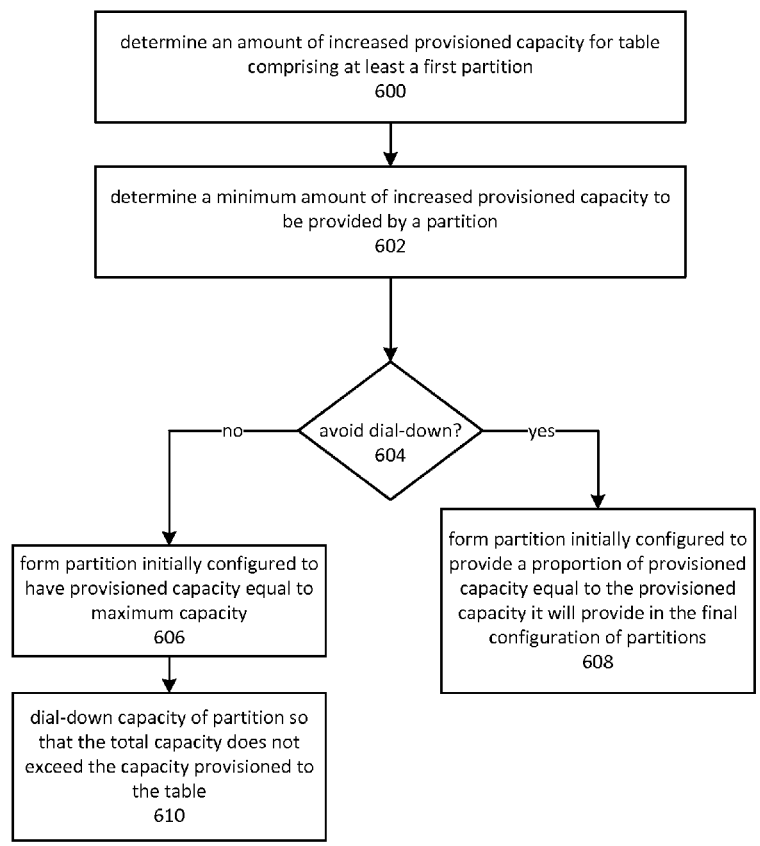
FIG. 6 is a flowchart depicting an embodiment of a process for increasing provisioned capacity for a partitioned table while preventing reductions in per-partition provisioned capacity.

In various cases and embodiments, forming child partitions from a parent partition may be a lengthy process. Embodiments may activate partitions in interim generations in order to minimize downtime and to make a requested increase in provisioned iops at least partially available prior to completion of the dial-up process. However, some embodiments may wish to prevent situations in which iops provisioned to a particular partition are reduced during a later stage of a dial-up process. Accordingly, interim generations of partitions may be provisioned in a manner that prevents subsequent dial-downs. FIG. 6 depicts an embodiment of a process for increasing provisioned capacity for a partitioned table while preventing reductions in per-partition provisioned iops. Although depicted as a sequence of operations, those of ordinary skill in the art will appreciate that the order of operations depicted in FIG. 6 should not be construed as limiting the scope of the present disclosure and that at least some of the depicted operations may be altered, omitted, reordered or performed in parallel.

Operation 600 depicts determining an amount of increased provisioned capacity for a table comprising at least one partition. The amount may be determined in response to receiving information indicative of increasing the capacity, such as a request from a client of the table or other various events or conditions.

At operation 602, embodiments may determine a minimum amount of increased capacity that is to be provided by a partition. Embodiments may determine the amount based on various factors, such as the total amount of increased capacity, the maximum capacity of an individual partition, the minimum number of partitions needed to provide the increased capacity, the amount of capacity reserved for future expansion and so on. Embodiments may, however, wish to increase iops provided by a partition based on other factors, such as increasing the responsiveness of a client request to increase provisioned iops.

At operation 604, embodiments may determine whether dial-down of the partition should be avoided. In some cases and embodiments, avoidance of dial-down may be considered a default behavior. In other cases and embodiments, avoidance of dial-down may be based on other various other factors. For example, avoiding dial-down may be employed based on a determination that data access patterns for the partition are such that a dial-down of provisioned iops would have a detrimental effect.

When dial-down does not need to be avoided, a partition may be configured to have a provisioned capacity equal to its maximum capacity, as depicted by operation 606. Embodiments may also configure the partition to provide a capacity less than its maximum, but more than its capacity in a final configuration. Operation 610 depicts dialing-down the capacity of the partition so that the total capacity of the table, considering all partitions, does not exceed the capacity provisioned to the table.

If dial-down is to be avoided, the partition may be configured to provide iops in an amount equal to what it will provide in its final configuration, when all partitions contributed to the increased iops level have been created. This amount may be equal to a minimum per-partition iops needed when a minimum number of partitions is used to provide the increased iops. Accordingly, operation 608 depicts forming a partition that is initially configured to provide a proportion of provisioned capacity equal to the provisioned capacity it will provide in the final configuration of partitions.

Figure 7:
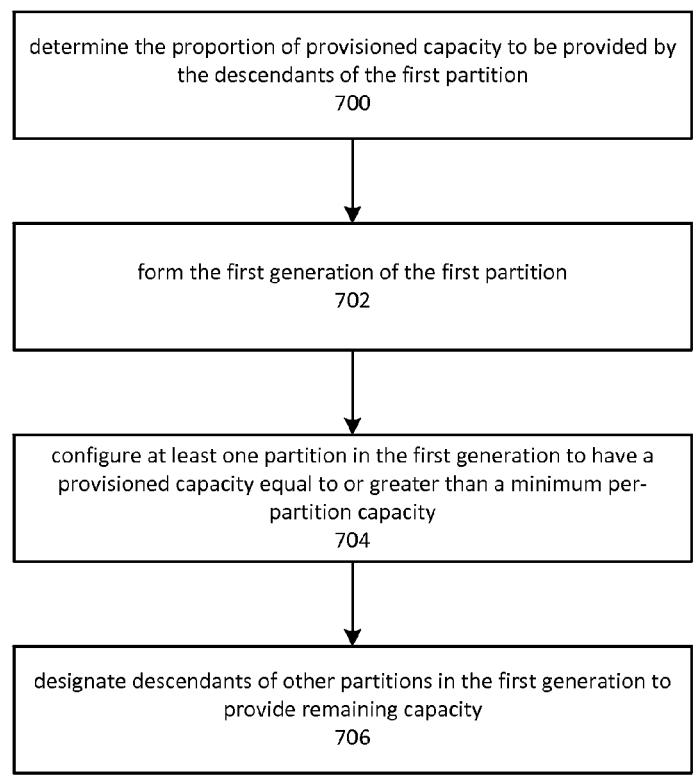
FIG. 7 is a flowchart depicting an example of a process for allocating provisioned capacity between members of a generation of partitions so that at least one partition in each generation may be formed initially in a configuration that may be considered final.

Embodiments may allocate portions of the total iops to be provided to various members of a generation of partitions or to their descendants. The portions may be allocated in a manner that improves efficiency of dialing-up provisioned iops. FIG. 7 depicts an example of a process for allocating iops between members of a generation of partitions so that at least one partition in each generation may be formed initially in a configuration that may be considered final. Although depicted as a sequence of operations, those of ordinary skill in the art will appreciate that the order of operations depicted in FIG. 7 should not be construed as limiting the scope of the present disclosure and that at least some of the depicted operations may be altered, omitted, reordered or performed in parallel.

Operation 700 depicts determining a proportion of provisioned capacity to be provided by the descendants of a first partition. The first partition may be split, as depicted by operation 702, into a plurality of partitions that may be described as the first generation of partitions. In some embodiments, the first partition may be split into two partitions.

Embodiments may reduce costs associated with splitting partitions by increasing the amount of data stored on finalized partitions in each generation of partitions. A finalized partition may be considered a terminal node, or in other words is not used to form child partitions. As a result, data stored on a finalized partition is not recopied in each generation of partitions. Operation 704 depicts an embodiment that configures at least one partition in each generation of partitions to have a provisioned capacity equal to or greater than a minimum per-partition capacity. The minimum per-partition capacity may be the minimum amount of iops that each partition must provide in order to provide the requested capacity, based on the number of partitions to be employed in the final configuration. The partition is configured to provide iops not exceeding its maximum number of iops. The partition may therefore be configured in an active state and need not be split further in order to supply the iops it is designated to supply.

As depicted by operation 706, the descendants of partitions not designated as terminal nodes may be designated to provide the remaining iops via their descendants. Embodiments may form additional generations of partitions and may select at least one additional partition in each generation to be a terminal node.

Figure 8:
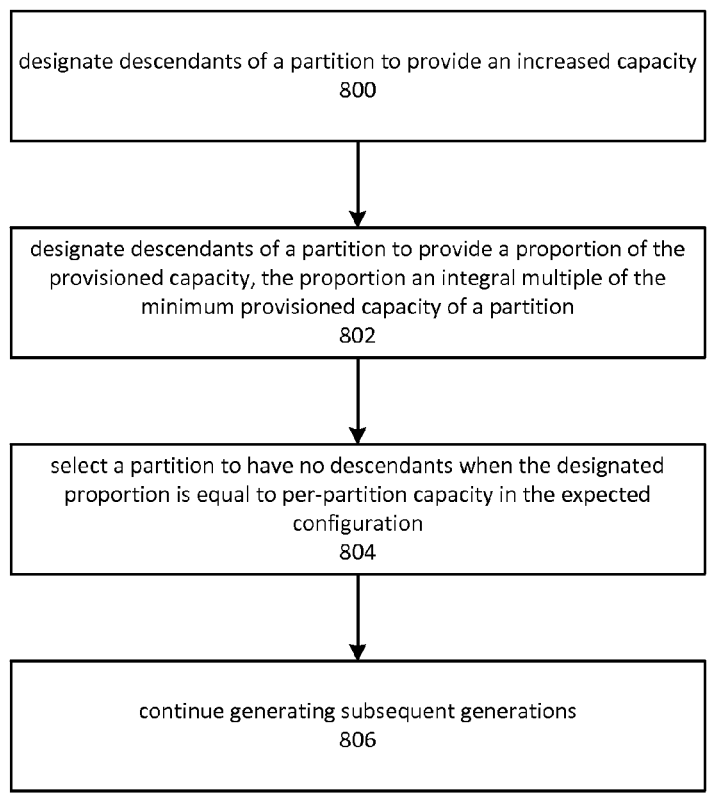
FIG. 8 is a flowchart depicting an embodiment of a process for forming successive generations of partitions using a flattened generational hierarchy.

Embodiments may form successive generations of partitions using techniques to reduce the time consumed by the operation and other costs. FIG. 8 depicts an embodiment of a process for forming successive generations of partitions using a flattened generational hierarchy. Although depicted as a sequence of operations, those of ordinary skill in the art will appreciate that the depicted order of operations should not be construed as limiting the scope of the present disclosure and that at least some of the depicted operations may be altered, omitted, reordered or performed in parallel.

Operation 800 depicts designating descendants of a partition to provide an increased capacity for a table. As depicted by operation 802, partitions within a first generation of partitions may be designated to provide some portion of the provisioned capacity. Embodiments may attempt to divide the portions between partitions in the first generation on a boundary that is proportional to an integral multiple of a minimum per-partition iops value. The minimum per-partition iops value may be based on dividing a value indicative of the increased capacity by a value indicative of the number of partitions that will be used to provide the capacity. For example, if 15,000 iops are to be provided and each partition may provide at most 3,500 iops, then 5 partitions could be used, each at 3,000 iops. If two partitions are in a generation of partitions, a first could be designated to provide 9,000 iops via its descendants, while a second could be designated to provide the remaining 6,000 iops via its descendants.

As depicted by operation 804, embodiments may select a partition to have no descendants when the proportion of iops assigned to it is equal to the per-partition iops expected in the final configuration. The expected value may be a minimum number of iops needed to provide the increased capacity, as calculated by dividing a value indicative of the increased capacity by the number of partitions to be used to provide the capacity. Embodiments may also select a partition to have no descendants when a proportion of iops assigned to the partition falls below the maximum capacity of the partition.

Subsequent generations of partitions may be generated in a similar manner, as depicted by operation 806. Assuming responsibility for providing iops is divided as evenly as possible in each generation, the hierarchy may be relatively flat with a majority of terminal nodes, or in other words partitions selected to have no descendants, residing towards the end of the hierarchy. This approach may reduce the operational time needed to complete the dial-up process.

Embodiments may select partitions in each generation based on a cost minimization approach. A cost minimization approach may be based on various factors, alone or in combination, such as provisioned throughput utilization, CPU utilization, data copying, time and so forth. Partition characteristics may also be utilized, such as the amount of data on a partition, the types of operations performed on the partition (such as read vs. write operations) and so on. Various heuristic approaches involving graph or tree-based searches may be employed to determine an optimized path for generating the partitions. Embodiments may search a graph, tree or other structure containing estimates of the cost of splitting a partition. Using such techniques, embodiments may estimate the cost of splitting an initial partition into a number of partitions able to provide the requested capacity.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices such as solid-state drives.

Figure 9:
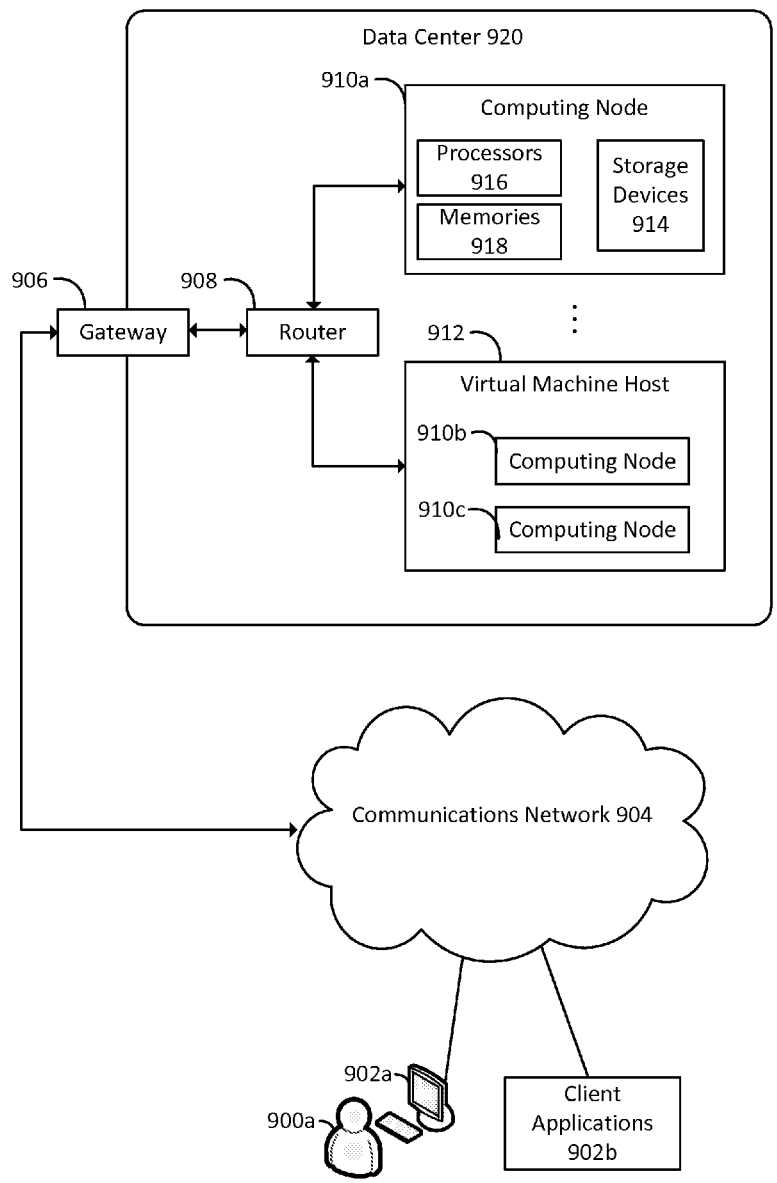
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a, 910b and 910c within a data center 920. Alternatively, client applications 902b may communicate without user intervention. Communications network 904 may comprise any combination of communications technology, including the Internet, wired and wireless local area networks, fiber optic networks, satellite communications and so forth. Any number of networking protocols may be employed.

Communication with processes executing on the computing nodes 910a, 910b and 910c, operating within data center 920, may be provided via gateway 906 and router 908. Numerous other network configurations may also be employed. Although not explicitly depicted in FIG. 9, various authentication mechanisms, web service layers, business objects or other intermediate layers may be provided to mediate communication with the processes executing on computing nodes 910*a*, 910*b* and 910*c*. Some of these intermediate layers may themselves comprise processes executing on one or more of the computing nodes. Computing nodes 910*a*, 910*b* and 910*c*, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910*a* is depicted as residing on physical hardware comprising one or more processors 916, one or more memories 918 and one or more storage devices 914. Processes on computing node 910*a* may execute in conjunction with an operating system or alternatively may execute as a bare-metal process that directly interacts with physical resources, such as processors 916, memories 918 or storage devices 914.

Computing nodes 910*b* and 910*c* are depicted as operating on virtual machine host 912, which may provide shared access to various physical resources such as physical processors, memory and storage devices. Any number of virtualization mechanisms might be employed to host the computing nodes.

The various computing nodes depicted in FIG. 9 may be configured to host web services, database management systems, business objects, monitoring and diagnostic facilities and so forth. A computing node may refer to various types of computing resources, such as personal computers, servers, clustered computing devices and so forth. A computing node may, for example, refer to various computing devices, such as cell phones, smartphones, tablets, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 10:
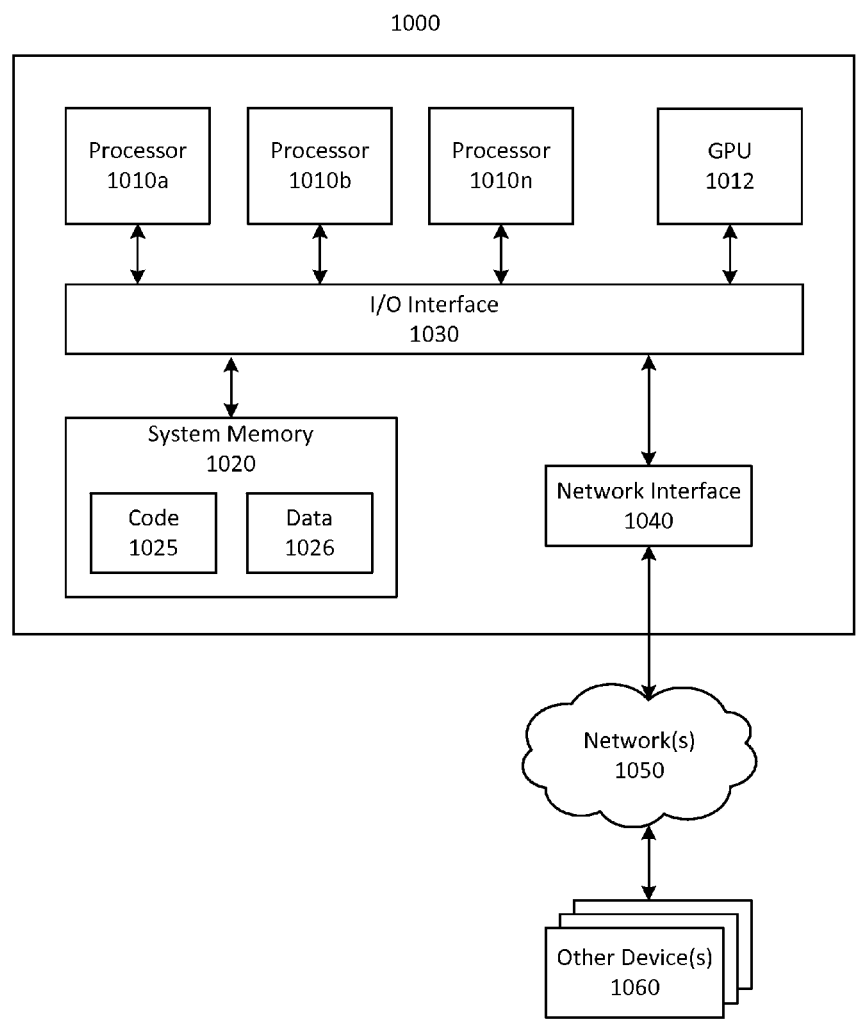
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010*a*, 1010*b* and/or 1010*n* (which may be referred herein singularly as a processor 1010 or in the plural as the processors 1010) coupled to a system memory 1020 via an input/output (I/O) interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC or MIPS ISAs or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory or any other type of memory. In the illustrated embodiment, program instructions and data implementing one or more desired functions, such as those methods, techniques and data described above, are shown stored within system memory 1020 as code 1025 and data 1026.

In one embodiment, I/O interface 1030 may be configured to coordinate I/O traffic between processor 1010, system memory 1020 and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more computing nodes storing a database table comprising at least one partition; and
   one or more memories having stored thereon computer readable instructions that, upon execution by a computing device, cause the system at least to:
   receive a request to increase throughput capacity for performing operations on the database table; and
   in response to the request:
   determine a number of partitions needed to provide an increased throughput capacity for the database table; and
   split the at least one partition into the determined number of partitions using at least two generations of splitting, wherein, for a given generation of splitting after a first split of the at least one partition, one or more partitions from a previous generation of splitting are split, and wherein after the at least two generations of splitting, each partition of the number of partitions stores a portion of the at least one partition from prior to the at least two generations of splitting.

2. The system of claim 1, further comprising one or more memories having stored thereon computer readable instructions that, upon execution by a computing device, cause the system at least to:
   configure a partition of the number of partitions to have a particular throughput capacity less than a maximum capacity, the particular throughput capacity based at least in part on the increased throughput capacity and the number of partitions.

3. The system of claim 1, further comprising one or more memories having stored thereon computer readable instructions that, upon execution by a computing device, cause the system at least to:
configure at least one partition in the number of partitions to have a capacity equal to or greater than a minimum capacity, the minimum capacity based at least in part on the increased throughput capacity and the number of partitions.

4. The system of claim 1, further comprising one or more memories having stored thereon computer readable instructions that, upon execution by a computing device, cause the system at least to:
determine a proportion of the increased throughput capacity to be provided by respective partitions of the number of partitions, the proportion based at least in part on an integral fraction of the increased throughput capacity; and
select, based at least in part on a partition of the number of partitions providing at least the proportion of the increased throughput capacity, a partition of the number of partitions to not have descendants within a hierarchical organization of the number of partitions.

5. A computer-implemented method comprising:
receiving information indicative of increasing throughput capacity for performing operations on a database table, the database table comprising at least one partition;
dynamically determining, based at least in part on the information, a number of partitions to provide an increased throughput capacity; and
splitting the at least one partition into the determined number of partitions using at least two generations of splitting, wherein, for a given generation of splitting after a first split of the at least one partition, one or more partitions from a previous generation of splitting are split, and wherein the determined number of partitions store respective portions of the at least one partition.

6. The computer-implemented method of claim 5, further comprising:
determining a minimum number of partitions to provide the increased throughput capacity, the minimum number of partitions based at least in part on the increased throughput capacity and a respective maximum capacity for a respective partition of the number of partitions, wherein the respective maximum capacity for a respective partition is based at least in part on computing resources available to the respective partition.

7. The computer-implemented method of claim 6, further comprising:
configuring a partition of the number of partitions to have a less than maximum capacity, the less than maximum capacity based at least in part on the increased throughput capacity and the minimum number of partitions to provide the increased throughput capacity.

8. The computer-implemented method of claim 6, wherein the number of partitions are organized as a hierarchy of partitions, and wherein at least one partition of the number of partitions has no descendants.

9. The computer-implemented method of claim 5, further comprising:
determining a cost of splitting a partition of the number of partitions; and
determining to not further split the partition based at least in part on the cost of splitting the partition.

10. The computer-implemented method of claim 5, further comprising:
determining a proportion of the increased throughput capacity to be provided by respective partitions of the number of partitions, the proportion based at least in part on an integral fraction of the increased throughput capacity; and
selecting, based at least in part on a partition of the number of partitions providing at least the proportion of the increased throughput capacity, one or more partitions of the number of partitions to not be split into additional partitions.

11. The computer-implemented method of claim 5, wherein a hierarchical organization of the number of partitions is based at least in part on reducing a number of deleted partitions in response to a request to reduce the increased throughput capacity.

12. The computer-implemented method of claim 5, wherein calculating the increased throughput capacity is based at least in part on a ratio of read and write operations.

13. The computer-implemented method of claim 5, wherein the at least one partition of the number of partitions is selected as a parent for another partition of the number of partitions based at least in part on determining that the at least one partition has a current capacity greater than other partitions in the number of partitions.

14. A non-transitory computer-readable storage medium having stored thereon instructions that, upon execution by one or more computing devices, cause the one or more computing devices at least to:
receive information indicative of increasing throughput capacity for performing operations on a database table comprising a partition;
determine, based at least in part on the information, a number of partitions to provide an increased throughput capacity; and
split the at least one partition into the determined number of partitions using at least two generations of splitting, wherein, for a given generation of splitting after a first split of the at least one partition, one or more partitions from a previous generation of splitting are split, and wherein each of the number of partitions stores at least a portion of the at least one partition.

15. The non-transitory computer-readable medium of claim 14, comprising further instructions that, upon execution by the one or more computing devices, cause the one or more computing devices to at least:
determine the number of partitions to provide the increased throughput capacity based at least in part on computing resources available to respective partitions of the number of partitions.

16. The non-transitory computer-readable medium of claim 14, wherein the number of partitions are organized as a hierarchy of partitions, and wherein at least one partition of the number of partitions has no descendants.

17. The non-transitory computer-readable medium of claim 14, comprising further instructions that, upon execution by the one or more computing devices, cause the one or more computing devices to at least:
determine a proportion of the increased throughput capacity to be provided by respective partitions of the number of partitions, the proportion based at least in part on an integral multiple of a per-partition throughput capacity; and
select, based at least in part on a partition of the number of partitions providing at least the proportion of the increased throughput capacity, a partition of the number of partitions to not be split into additional partitions.

18. The non-transitory computer-readable medium of claim 14, wherein the number of partitions is based on a cost of provisioning the increased throughput capacity, and wherein the cost comprises at least one of time, network bandwidth, and storage device usage.

19. The non-transitory computer-readable medium of claim 14, comprising further instructions that, upon execution by the one or more computing devices, cause the one or more computing devices to at least:

calculate the increased throughput capacity based on a ratio of read operations to write operations.

20. The non-transitory computer-readable medium of claim 14, wherein the at least one partition is selected based at least in part on minimizing costs of provisioning the number of partitions to provide the increased capacity.

21. The non-transitory computer-readable medium of claim 14, comprising further instructions that, upon execution by the one or more computing devices, cause the one or more computing devices to at least:

minimize a cost of providing the increased throughput capacity based at least in part on estimating a cost of splitting the partition into the number of partitions.

* * * * *